(12) United States Patent
Daley, III et al.

(10) Patent No.: US 7,918,049 B2
(45) Date of Patent: Apr. 5, 2011

(54) COLLAPSIBLE LOOP-SPRING ACTUATED FISH CRADLE DEVICE

(76) Inventors: Joseph A Daley, III, Jupiter, FL (US);
Joseph A. Daley, Jr., Hobe Sound, FL (US)

(*) Notice: Subject to any disclaimer, the term of this patent is extended or adjusted under 35 U.S.C. 154(b) by 152 days.

(21) Appl. No.: 12/387,777

(22) Filed: May 7, 2009

(65) Prior Publication Data

US 2010/0281752 A1    Nov. 11, 2010

(51) Int. Cl.
*A01K 77/00*  (2006.01)

(52) U.S. Cl. .................................. 43/11; 43/12

(58) Field of Classification Search ............ 43/7, 8, 43/11, 12
See application file for complete search history.

(56) References Cited

U.S. PATENT DOCUMENTS

| | | | | |
|---|---|---|---|---|
| 1,457,886 A | * | 6/1923 | Dukas | 43/12 |
| 2,780,020 A | * | 2/1957 | Henry | 43/12 |
| 3,521,392 A | * | 7/1970 | Brown | 43/12 |
| 3,699,700 A | * | 10/1972 | Kinsell | 43/14 |
| 4,089,074 A | * | 5/1978 | Sermons | 210/167.2 |
| 4,956,935 A | * | 9/1990 | Riddell | 43/105 |
| 5,419,074 A | * | 5/1995 | Thomas | 43/5 |
| 5,605,003 A | * | 2/1997 | Krc et al. | 43/12 |

FOREIGN PATENT DOCUMENTS

GB          2268865 A   *   1/1994

* cited by examiner

*Primary Examiner* — Kimberly S Smith

(57) ABSTRACT

A design for improvements to the prior art of conventional A-frame fish capture devices which incorporates one or more flexible loop spring mechanism(s) and a multi-functional crossbeam splay limiting and hand grip apparatus, attached to an A-frame structure which enables collapsing the device into a nearly flat condition for storage and when deployed the loop-spring mechanism instantly splays out the crossbeams and pushes the mouth of the net into a deep trough enabling the angler single handed instant deployment and attitude control of the net to enable prompt landing which minimizes stress by rapidly cradling the fish during landing.

2 Claims, 4 Drawing Sheets

COLLAPSIBLE LOOP-SPRING ACTUATED FISH CRADLE DEVICE

FIELD OF THE INVENTION

The present invention relates generally to an improvement on the prior art A-frame fish net to facilitate an angler's ability to more quickly retrieve the net device from flat storage and deploy the uniquely functioning net to cradle a fish that has been caught by hook and line, facilitating landing of the fish from water.

BACKGROUND OF THE INVENTION

Conventional devices used to land fish having been caught with a hook and line are effective in capturing the fish but the fish usually die as a result of the process. In recent years there has been a focus from sportsmen and environmentalists alike on promoting the use of devices that minimize stress to the fish during catch and release so as to maintain the species and the sport. Recent studies indicate that due to the current state of design for these devices, a large percentage of the fish that are caught and released die within twenty-four hours due to the delays in deploying a net from storage, landing, unhooking and releasing the fish. The prior art is awkward to store, transport and quickly deploy from a collapsed storage and does not offer rapid deployment by spring loading nor provide a deep trough at the mouth of the net for easy capture. The prior art also does not provide for single handed use of the net enabling the angler to hold and articulate the net in one hand while holding the fishing pole in the other.

SUMMARY OF THE INVENTION

An object of the invention is to functionally, structurally and practically improve upon prior art A-frame fish nets. Nets of the prior art include the substantially A-shaped scooping surf net shown in U.S. Pat. No. 2,780,020 to Butler, the Dip for Surf Fishing net disclosed by U.S. Pat. No. 3,521,392 to Brown and the Fish Landing Device shown in U.S. Pat. No. 5,419,074 to Thomas. None of the prior art inventions incorporate a spring mechanism that both instantly facilitates the deployment of an A-frame net from a flat storage position to a splayed configuration and provides a deep trough shape at the mouth of the net. The prior art also does not provide an apparatus where the splay of the A-frame crossbeams are limited and controlled by straps attached to a centrally positioned hand grip which aligns with the crossbeams such that the angler can dip or raise the attitude of the net with one hand by a simple articulation of the wrist in an upward or downward motion, respectively.

The present invention incorporates new and useful improvements to the prior art A-frame fish net design. In particular, the invention improves upon the prior art A-frame fish net by adding one or more mechanisms including a flexible loop-spring(s) and the incorporation of an A-frame crossbeam splay limiter apparatus, thereby allowing for the quick retrieval of the fish in a stress reducing manner.

More specifically the invention incorporates the use of one or more loop-spring mechanisms and a crossbeam splay limiting apparatus with straps and hand grips which enable a single angler to quickly deploy the net from a nearly flat storage position and to splay the crossbeams and force the mouth of the net into a deep trough at the opening end of the A-frame. The invention further provides for enabling the angler to quickly reform the A-frame net back to a nearly flat profile for flat storage and transport. The splay limiting apparatus comprises two straps, one end of each strap is attached to a crossbeam and the other end of the strap is attached to a centrally located single hand grip which is axially aligned with the crossbeams. Such configuration allows the angler, with one hand, to articulate a single wrist upward or downward such that the attitude of the net will raise or dip during the landing process. Once the fish is entrapped within the A-frame net, the angler raises the net such that the crossbeams align in a side by side configuration thereby allowing the netting material to surround the fish and enable the gentle support of the fish when being lifted from the water. The individual features of the improvements described herein create advancements to the current state of the design of conventional A-frame nets.

DETAILED DESCRIPTION

Figure 1:
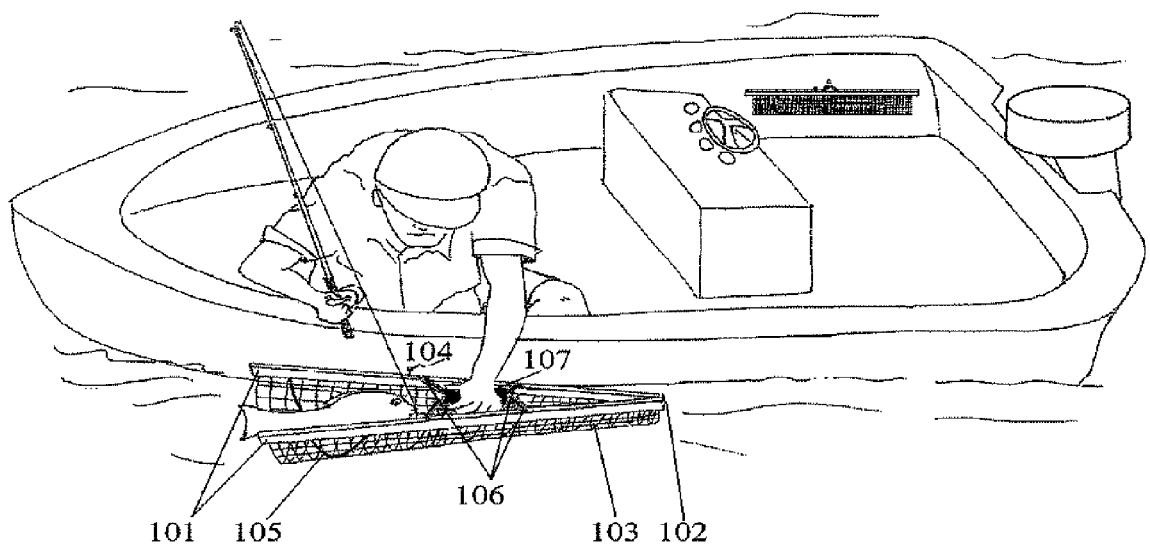
FIG. 1 shows an A-frame net being used by an angler with the loop-spring splaying out the crossbeams and also pushing the net downward from the crossbeams to form a deep trough at the mouth of the net. Straps are attached to a handgrip at one end and to the crossbeams at the other end so that the hand grip is axially aligned with the crossbeams and held in one hand by the angler, controlling the attitude of the net and allowing the fishing pole to be held by the angler's other hand while a fish is being scooped into the net.
Figure 2:
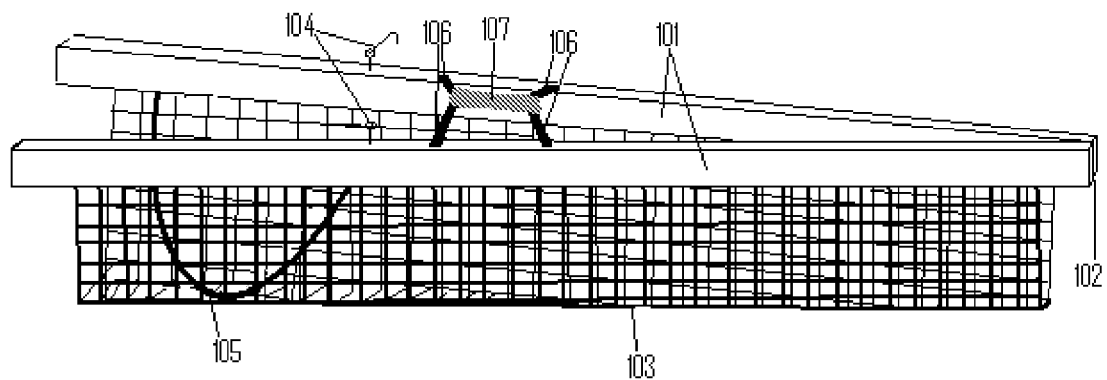
FIG. 2 shows an enlarged side view of the device in the deployed/splayed position.
Figure 3:
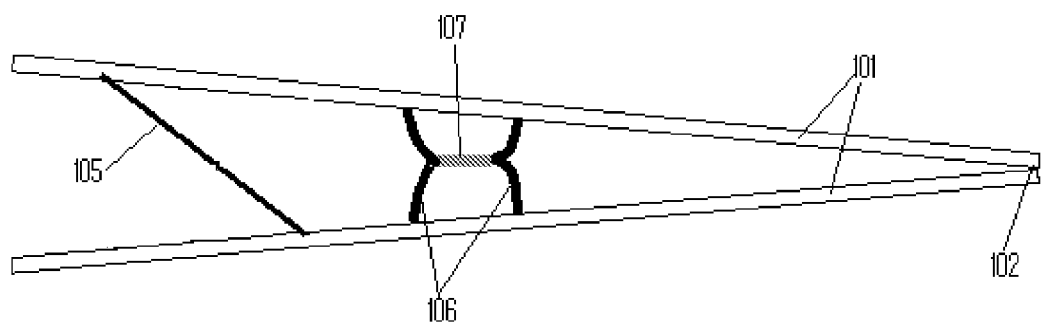
FIG. 3 is a view looking up at the device from underneath in the deployed/splayed position.
Figure 4:
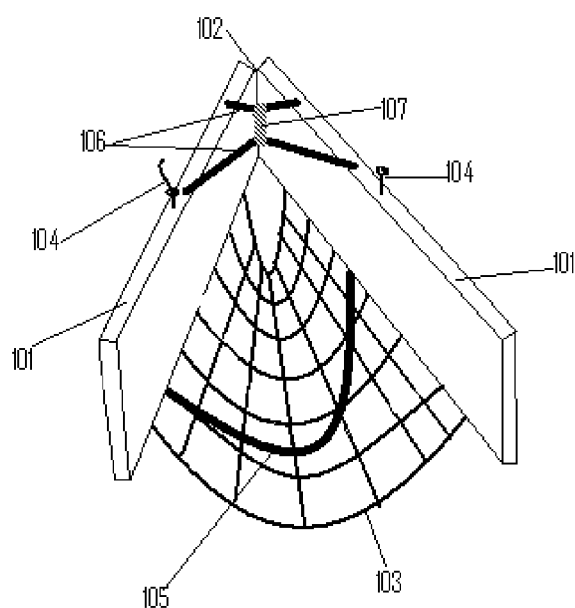
FIG. 4 is a frontal view of the device in the deployed/splayed position.
Figure 5:
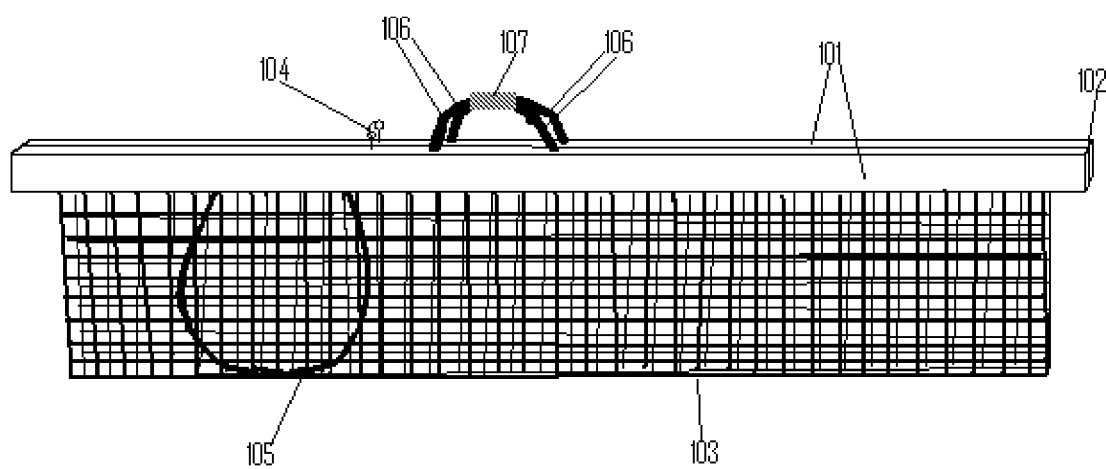
FIG. 5 is a side view of the device in the stored/unsplayed position.
Figure 6:
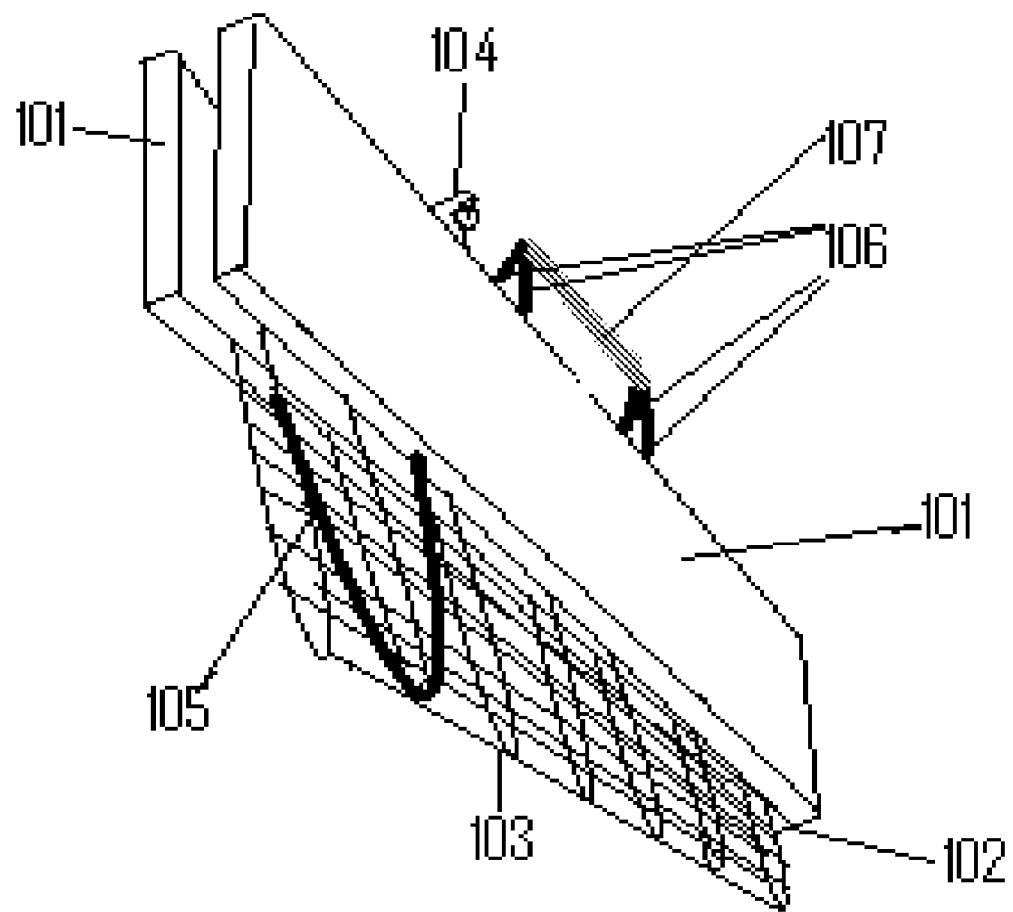
FIG. 6 is a frontal view of the device illustrating the rotated position of the loop-spring when in the stored/unsplayed position.

The improvement to the prior art invention will now be described with reference to the drawing figures in which the reference numerals refer to like parts throughout. The embodiment of the invention consists of FIG. 1 which illustrates an A-frame net being deployed single handedly by an angler, controlling the attitude of the net and depicting a fish entering the net. The net consists of crossbeams 101 having a flexible connection 102 at one end with a net material 103 attached to the A-frame crossbeams 101. A latch 104 is disengaged from opposite beams allowing for the deployed/splayed position. The net further comprises a splay limiting apparatus consisting of straps 106 attached to the crossbeams 101 at one end of the straps 106 and to a hand grip 107 attached to the other end of the straps. The straps together control both the splay of the crossbeams and the shape of the loop-springs resulting in the shape of the mouth of the depth being configured into a deep trough thereby enabling the angler to control the attitude of the net from the hand grip. FIG. 2 shows an enlarged side view of the same device in the deployed/splayed position with all of the features noted in FIG. 1, above. FIG. 3 shows a view looking up at the device from underneath the device when in the deployed/splayed position with all of the features noted above in FIG. 1 installed with the net material removed so as to illustrate the loop-spring fastened from one crossbeam to the opposing crossbeam at different axial locations along each crossbeam. FIG. 3 illustrates how the loop-spring is rotated away from the axial direction of the crossbeams when deployed. FIG. 4 is a frontal view of the device in the deployed/splayed position with features noted above in FIG. 1 installed except for the net material 103 is removed to illustrate in a front view where the loop-spring is installed. FIG. 5 is a view of the device in the stored position with all of the features noted above in FIG. 1 installed with the latch 104 engaged to hold the spring-loaded crossbeams 101 and net material together and the loop-spring 105 rotated into a nearly flat position for storage. FIG. 6 is a view of the device showing the mouth of the device in the stored/unsplayed position illustrating the rotated position of the loop-spring to align the crossbeams with all of the features noted above in FIG. 1 installed with the latch 104 engaged to hold the spring loaded crossbeams 101 together with the loop-spring 105 in a nearly flat position for storage.

What is claimed is:

1. A collapsible loop-spring actuated fishing cradle device comprising,
    an A-frame net comprising two crossbeams, a flexible connection joining said crossbeams at a first end of the A-frame net, netting material attached to each of said crossbeams, said netting material extending along a substantial length of said crossbeams,
    a splay-limiting apparatus comprising two straps, each strap attached to a respective crossbeam at one end of the strap and a hand grip attached to the other end of said straps and aligned axially with the crossbeams,
    at least one loop-spring attached to said A-frame net, said loop-spring comprising one attachment point along the length of one of said crossbeams at a location distal from the first end, a second end of said loop-spring attached to said other crossbeam at a second attachment point a length along the crossbeam axially differing from the first attachment point,
    wherein said loop spring in a splayed position allows for rapid deployment of said A-frame such that said end opposite said first end is expanded and said loop spring pushes downward into said netting material thereby forming and maintaining a trough shape in the netting between said crossbeams and wherein said loop spring in an unsplayed position is compressed by rotation to a nearly flat plane aligning with the crossbeams when said crossbeams are brought together in a side by side configuration.

2. The fishing cradle device of claim 1 further comprising a latch, said latch maintaining said crossbeams together in the unsplayed position.

* * * * *